Jan. 14, 1947.　　　D. D. ROTH　　　2,414,244
CHILD'S VEHICLE
Filed Oct. 4, 1943　　　4 Sheets-Sheet 1
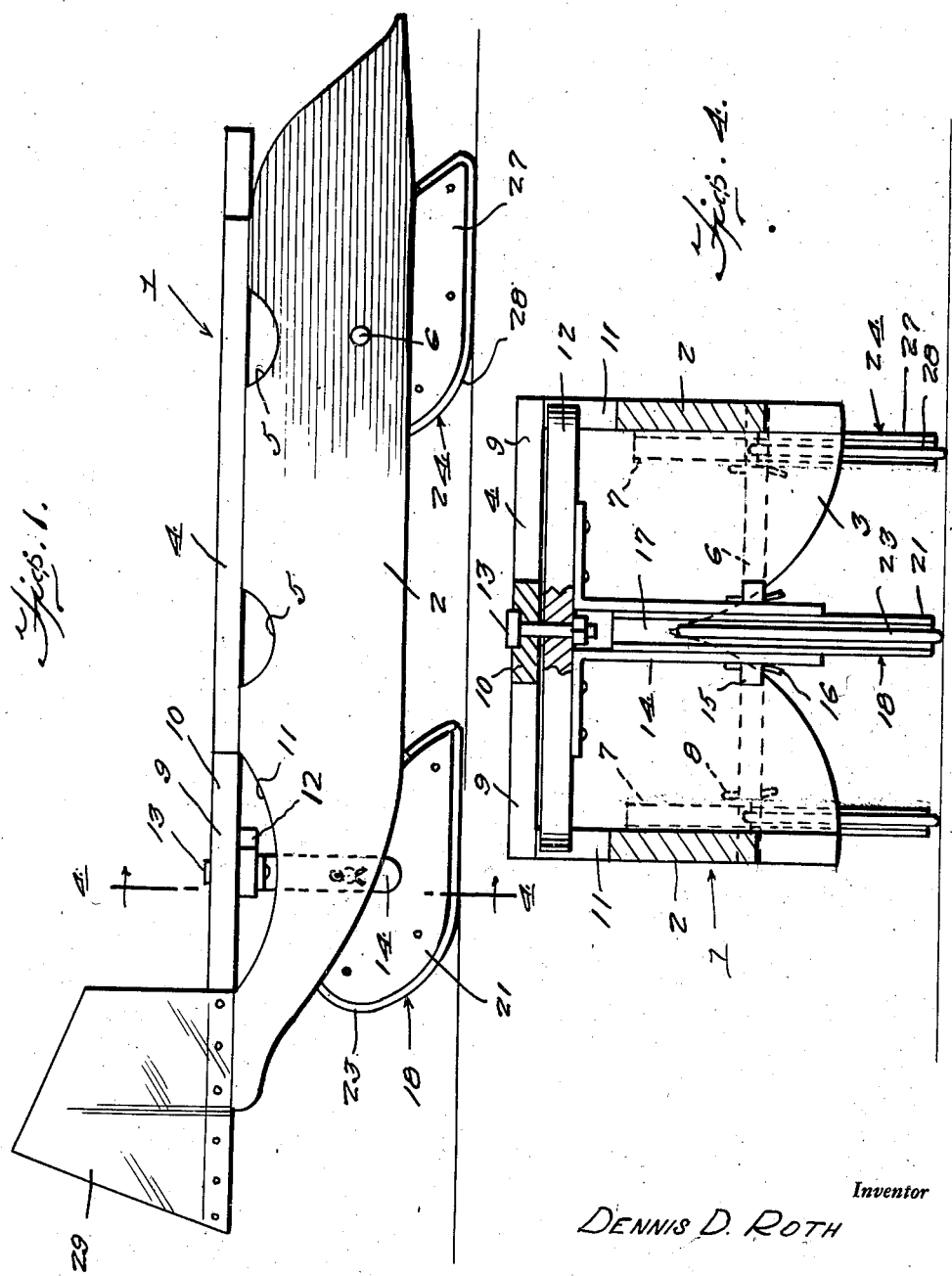
Inventor
DENNIS D. ROTH
By Clarence A. O'Brien
and Harvey B. Jacobson
Attorneys Jan. 14, 1947.  D. D. ROTH  2,414,244
CHILD'S VEHICLE
Filed Oct. 4, 1943  4 Sheets-Sheet 2
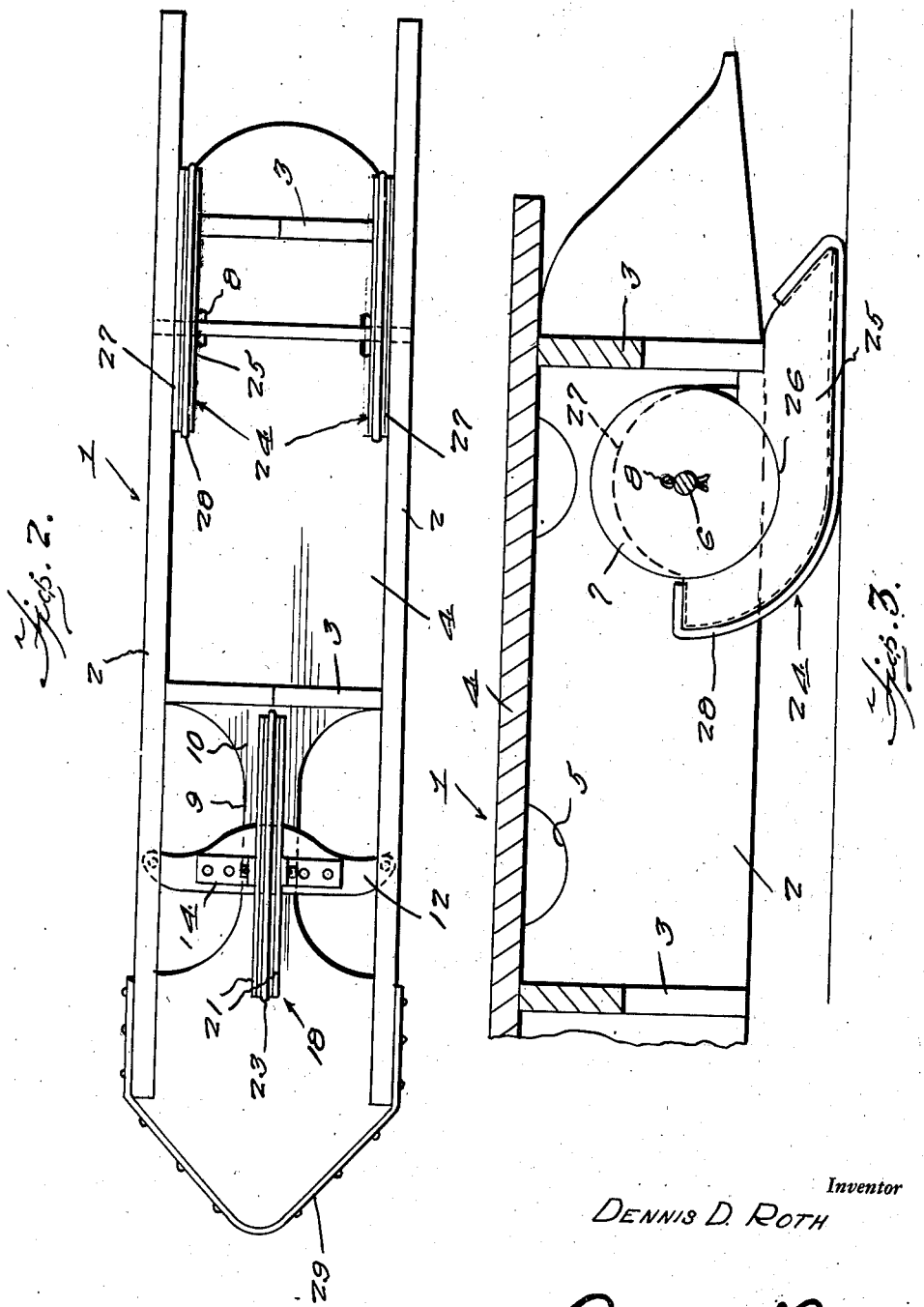
Inventor
DENNIS D. ROTH
By Clarence A. O'Brien
and Harvey B. Jacobson
Attorneys

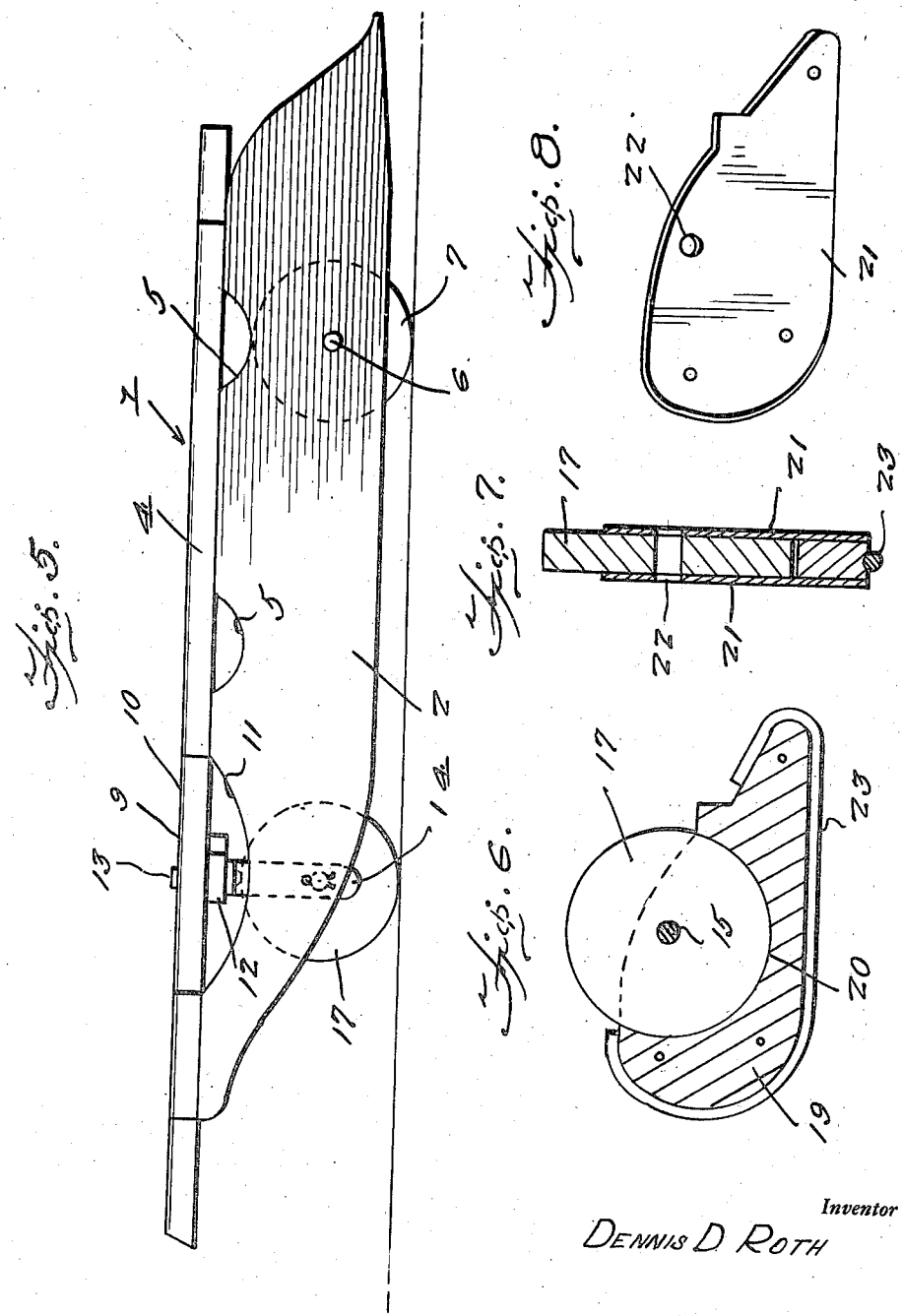

Jan. 14, 1947.  D. D. ROTH  2,414,244
CHILD'S VEHICLE
Filed Oct. 4, 1943  4 Sheets-Sheet 4

Inventor
DENNIS D. ROTH

By Clarence A. O'Brien
and Harvey B. Jacobson
Attorneys

Patented Jan. 14, 1947

2,414,244

UNITED STATES PATENT OFFICE 2,414,244

CHILD'S VEHICLE

Dennis D. Roth, Philadelphia, Pa., assignor of one-half to Donald Eckel, Philadelphia, Pa.

Application October 4, 1943, Serial No. 504,923

3 Claims. (Cl. 280—13)

The present invention relates to new and useful improvements in children's vehicles, and has for its primary object to provide, in a manner as hereinafter set forth, a combination device of this character which is adapted to be expeditiously converted from a wagon to a sled and vice versa.

Another very important object of the invention is to provide a convertible child's vehicle of the aforementioned character comprising runners of a unique construction, whereby said runners may be readily mounted on the wheels of the device and removed therefrom.

Still another important object of the invention is to provide a child's vehicle of the character described which embodies novel steering means.

Other objects of the invention are to provide a combination child's vehicle which will be comparatively simple in construction, strong, durable, of light weight, attractive in appearance, and which may be manufactured at low cost.

All of the foregoing, and still further objects and advantages of the invention will become apparent from a study of the following specification, taken in connection with the accompanying drawings wherein like characters of reference designate corresponding parts throughout the several views, and wherein:

Figure 1 is a view in side elevation of a child's vehicle constructed in accordance with the present invention, showing the device ready for use as a sled.

Figure 2 is a bottom plan view thereof.

Figure 3 is a view in vertical longitudinal section through the rear end portion of the device.

Figure 4 is a cross-sectional view, taken substantially on the line 4—4 of Figure 1, showing a portion of the steering bar broken away in section.

Figure 5 is a view in side elevation, showing the device ready for use as a wagon.

Figure 6 is a view in vertical longitudinal section through the front runner and wheel assembly.

Figure 7 is a view in cross-section through the front runner and wheel assembly.

Figure 8 is a detail view in perspective of one of the metallic side plates of the front runner.

Figure 9 is a view in side elevation, showing a modified runner mounted on a wheel.

Figure 10 is a view in horizontal section, taken substantially on the line 10—10 of Figure 9.

Figure 11 is a cross-sectional view, taken substantially on the line 11—11 of Figure 9.

Referring now to the drawings in detail, it will be seen that reference character 1 designates generally a body of wood, which body may be of any suitable dimensions. The body 1 includes a pair of spaced, parallel side members 2 between which cross bars 3 extend at spaced points. Mounted on the members 2 and 3 is a top 4. Hand openings 5 are provided in the upper portions of the side members 2.

Extending between the side members 2 in the rear end portion of the body 1 is an axle 6. Wheels 7 are journaled on the axle 6 adjacent the side members 2 and project below the lower edges thereof. Cotter pins 8 retain the wheels 7 in position adjacent the side members 2.

Forwardly of the front cross bar 3, the side portions of the top 4 are recessed, as at 9, in a manner to provide a comparatively narrow connecting or neck portion 10. The adjacent upper portions of the side members 2 are also recessed, as at 11. It will be noted that the recesses 9 and 11 communicate. The recesses 9 and 11 provide access to and accommodate a steering bar 12 which is pivotally secured at 13 beneath the neck 10.

Fixed beneath the steering bar 12 and depending therefrom is a pair of metallic hangers 14. An axle 15 is removably secured in the hangers 14 by cotter pins 16. A single front wheel 17 is journaled on the axle 15 between the hangers 14.

Mounted on the front wheel 17 is a removable runner assembly 18. As best seen in Figures 6, 7 and 8 of the drawings, the assembly 18 includes a shoe 19 of wood having a segmental recess 20 in its upper portion for the reception of the wheel 17. Metallic side plates 21 are secured on the shoe 19 and receive the wheel 17 therebetween. The side plates 21 are journaled on the axle 15 between the wheel 17 and the hangers 14, said side plates having openings 22 therein which accommodate said axle. Mounted on the shoe 19 is a runner 23 which extends upwardly around the ends of said shoe.

Runner assemblies 24 are removably mounted on the rear wheels 7 and the rear axle 6. The assemblies 24 include wooden shoes 25 having recesses 26 in their upper portions for the reception of the lower portions of the wheels 7. Fixed on the outer sides of the shoes 25 and extending upwardly therefrom are metallic plates 27 which are journaled on the axle 6 between the wheels 7 and the side members 2 of the body 1. The shoes 25 are equipped with runners 28.

It is thought that the operation of the device as thus far described will be readily apparent from a consideration of the foregoing. Of course, when the vehicle is to be used as a sled, it travels on the runners 23 and 28. When so used, a removable plastic windshield 29 is mounted on the forward end portion of the body 1. Steering is readily accomplished by swinging the bar 12 for turning the wheel and runner assembly thereon. Swinging of the assemblies 18 and 24 in a counterclockwise direction is positively limited by the engagement of the rear end portions of the shoes 19 and 25 beneath the adjacent cross bars 3. This is illustrated to advantage in Figure 3 of the drawings. When the vehicle is to be used as a wagon, the assemblies 18 and 24 are removed. This is accomplished by extracting the cotter pins 8 and 16 for permitting removal of the axles 6 and 15, thus releasing the side plates 27 and 21.

The steering bar 12, being mounted beneath the neck 10, leaves the upper surface of the top 4 smooth and unobstructed. It will be observed that the steering bar 12 does not project from the body 1, but is confined to and operable within said body. Thus, the hands or feet which grip or engage the bar 12 are protected or shielded against injury.

In Figures 9, 10 and 11, there is shown a modified runner assembly which is designated generally by reference character 40. The assembly 40 is shown on the wheel 38.

The assembly 40 includes a metallic shoe 41 which is adapted to be mounted in trailing position beneath the wheel. Toward this end, the forward portion of the shoe 41 is formed to provide a segmental channel 42 for the reception of the lower portion of the tire 39 on the wheel 38. The channel member 42 is provided with integral side flanges 43. Slidably or telescopically mounted on the channel member 42 is a section 44 which, when in extended position, lies close to the tire circumferentially for retaining the shoe 41 in position thereon. The extension 44 includes side flanges 45 which are slidably interlocked with the flanges 43 for mounting said extension on the channel member 42. The lower portions of the shoe 41 and the channel member 42 are formed to provide a runner 46.

To mount the assembly 40 on the wheel, the extension 44 is placed in retracted position on the channel member 42. The channel member 42 is then engaged beneath the wheel and the retaining member 44 is then moved circumferentially around said wheel to its extended or operative position. The construction and arrangement is such that the assembly 40 may be expeditiously mounted in position or removed without the necessity of disturbing the wheel and the axle.

It is believed that the many advantages of a child's vehicle constructed in accordance with the present invention will be readily understood, and although preferred embodiments are as illustrated and described, it is to be understood that further modifications and changes in the details of construction may be resorted to which will fall within the scope of the invention as claimed.

What is claimed is:

1. A child's vehicle comprising a body, a wheel mounted beneath said body, a metallic shoe removably mounted beneath the wheel, said shoe including a substantially segmental channel member for the reception of the wheel, a substantially segmental extension of channel-shaped cross-section slidable on said channel member and positionable close circumferentially to the upper portion of the wheel for retaining the shoe thereon, and a runner on the shoe and channel member.

2. A child's vehicle of the character described comprising a body, a wheel mounted beneath said body, a tire on the wheel, and a shoe removably mounted on the wheel, said shoe including, on one end portion, a substantially segmental channel member for the reception of the lower portion of the tire, and a substantially segmental extension of channel-shaped cross-section slidably mounted on the channel member and positionable close circumferentially to the tire for retaining the shoe in position thereon.

3. A child's vehicle comprising a body including spaced parallel sideboard members and a top board member mounted on and bridging said side board members; a transverse axle having its ends mounted in the rear portions of said side board members, surface-engaging elements journaled on the end portions of said axle at the inner sides of said side board members, a horizontal steering bar pivotally mounted intermediate its ends on the under side of the forward portion of said top board member for swinging movement about a vertical axis, a pair of spaced hangers fixed to and depending from the intermediate portion of said steering bar, a further axle mounted in the lower ends of said hangers, and a further surface-engaging steering element journaled on the last-named axle between said hangers, said side board members having notches in the upper edges of their forward portions, said top board member having notches in opposite sides of its forward portion communicating with the notches of the side board members to expose the ends of the steering bar for actuation inwardly of said side board members, the ends of said steering bar terminating inwardly of the outer faces of said side board members.

DENNIS D. ROTH.